United States Patent
Boxey

(10) Patent No.: US 6,474,678 B1
(45) Date of Patent: Nov. 5, 2002

(54) TETHER ATTACHMENT FOR MULTI-LAYERED INFLATABLE CURTAIN

(75) Inventor: Kevin J. Boxey, Columbiaville, MI (US)

(73) Assignee: TRW Vehicle Safety System Inc., Lyndhurst, OH (US)

( * ) Notice: Subject to any disclaimer, the term of this patent is extended or adjusted under 35 U.S.C. 154(b) by 0 days.

(21) Appl. No.: 10/000,531

(22) Filed: Oct. 23, 2001

(51) Int. Cl.[7] .............................................. B60R 21/16
(52) U.S. Cl. ................................. 280/728.2; 280/730.2
(58) Field of Search ........................... 280/728.2, 730.1, 280/730.2, 743.2

(56) References Cited

U.S. PATENT DOCUMENTS 6,155,597 A    12/2000  Bowers et al.
6,237,939 B1 *  5/2001  Resh ....................... 280/730.2
6,237,943 B1 *  5/2001  Brown et al. ............. 280/728.2

* cited by examiner

Primary Examiner—Paul N. Dickson
Assistant Examiner—Faye M. Fleming
(74) Attorney, Agent, or Firm—Tarolli, Sundheimm, Covell, Tummino & Szabo, L.L.P.

(57) ABSTRACT

An apparatus (10) for helping to protect an occupant of a vehicle (12) comprises an inflatable device (14) including overlying first and second panels (40, 42) interconnected to form a perimeter connection (46) extending along a perimeter (48) of the device and to define an inflation fluid volume between the first and second panels. The apparatus (10) also comprises a tether (80) having a first end portion (120) connected with the device (14) and a second end portion (122) for connection with a portion (126) of the vehicle (12) for helping to maintain the device in position when inflated. The device (14) has a tether mounting portion (90) comprising interconnected portions (94, 96) of the first and second panels (40, 42). The first end portion (120) of the tether (80) extends between the first and second panels (40, 42) and extends around the tether mounting portion (90).

11 Claims, 2 Drawing Sheets

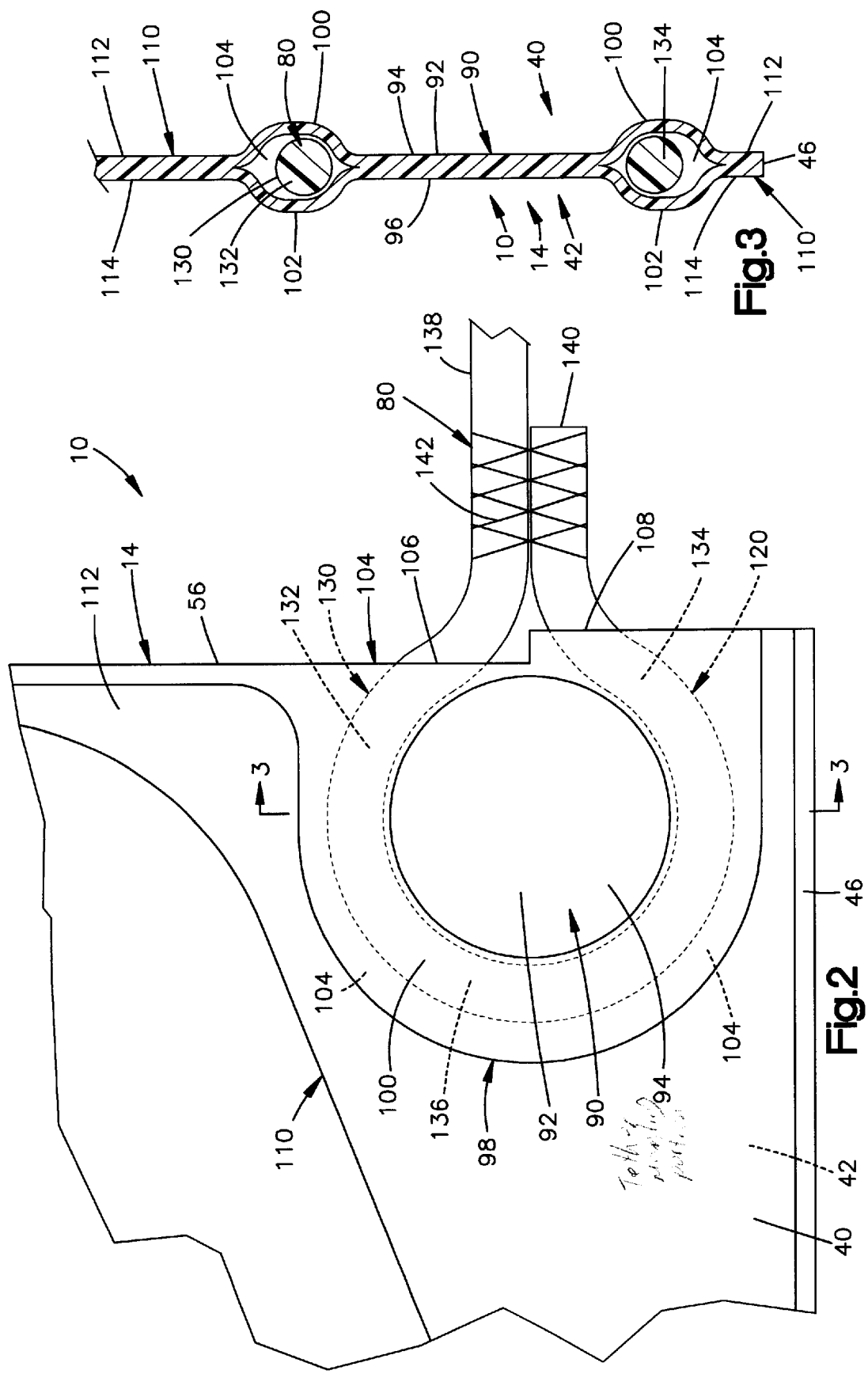

TETHER ATTACHMENT FOR MULTI-LAYERED INFLATABLE CURTAIN

BACKGROUND OF THE INVENTION

1. Technical Field

The present invention relates to an inflatable apparatus for helping to protect a vehicle occupant in the event of a side impact to a vehicle and/or a vehicle rollover. In particular, the present invention relates to the attachment of a tether to a side curtain.

2. Description of the Prior Art

It is known to inflate an inflatable vehicle occupant protection device to help protect a vehicle occupant in the event of a vehicle collision. One particular type of inflatable vehicle occupant protection device is an inflatable curtain. The inflatable curtain inflates away from the roof of the vehicle downward inside the passenger compartment between a vehicle occupant and the side structure of the vehicle in the event of a side impact or rollover.

A known inflatable curtain is inflated from a deflated condition by inflation fluid directed from an inflator to the inflatable curtain through a fill tube. The curtain includes first and second overlying panels that are interconnected to define an inflatable volume. The curtain is formed by weaving the first and second panels simultaneously, while also interweaving a perimeter connection and some interior connections as single layers of fabric.

It is known to attach tethers to front and back corners of an inflatable curtain, to help maintain the position of the curtain when inflated. The tethers are typically attached by sewing the tether to the fabric material of the tether. This unavoidably makes perforations in the fabric material.

SUMMARY OF THE INVENTION

The present invention is an apparatus for helping to protect an occupant of a vehicle. The apparatus comprises an inflatable vehicle occupant protection device comprising overlying first and second panels interconnected to form a perimeter connection extending along a perimeter of the inflatable device and to define an inflation fluid volume between the first and second panels. The apparatus also comprises a tether having a first end portion connected with the inflatable device and a second end portion for connection with a portion of the vehicle for helping to maintain the inflatable device in position when inflated. The inflatable device has a tether mounting portion comprising interconnected portions of the first and second panels. The first end portion of the tether extends between the first and second panels and extends around the tether mounting portion.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 2 is an enlarged view of a portion of the apparatus of FIG. 1; and

FIG. 3 is an enlarged sectional view of a portion of the apparatus of FIG. 1, taken along line 3—3 of FIG. 2.

DETAILED DESCRIPTION OF THE INVENTION

Figure 1:
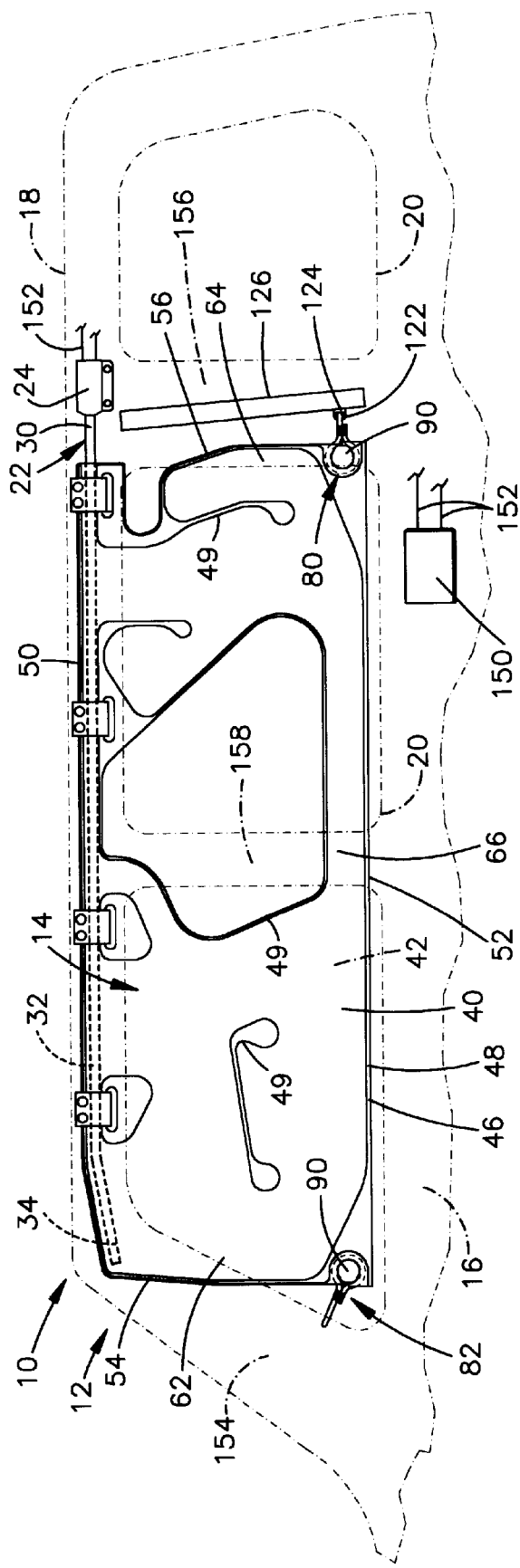
FIG. 1 is a schematic view of an apparatus for helping to protect a vehicle occupant illustrating the apparatus in a inflated condition.

The present invention relates to an inflatable apparatus for helping to protect a vehicle occupant in the event of a side impact to a vehicle and/or a vehicle rollover. In particular, the present invention relates to the attachment of a tether to a side curtain.

As representative of the present invention, FIG. 1 illustrates an apparatus 10 for helping to protect an occupant of a vehicle 12. The apparatus 10 includes an inflatable vehicle occupant protection device in the form of an inflatable curtain 14. The inflatable curtain 14 is mounted adjacent the side structure 16 of the vehicle 12 and a roof 18 of the vehicle. The roof 18 may be either a standard roof that is fixed in place or a convertible roof that can be moved or removed. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14. As shown in FIG. 1, the second end portion 32 may include an angled portion 34 that extends at an acute angle from the remainder of the fill tube 22.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 22 could be of any suitable type or construction for supplying a medium for inflating the inflatable curtain 14.

The apparatus 10 includes a housing (not shown) that stores the inflatable curtain 14 when it is in a deflated condition. The fill tube 22, the deflated inflatable curtain 14, and the housing have an elongate configuration and extend along the vehicle roof 18 and along the side structure 16 of the vehicle 12 above the side windows 20.

The inflatable curtain 14 (FIGS. 1–3) comprises first and second panels 40 and 42 that are arranged in an overlying manner. The first and second panels 40 and 42 are interconnected to form a perimeter connection 46 (FIGS. 2 and 3) that extends along a perimeter 48 of the panels. The first and second panels 40 and 42 are also interconnected at certain places to form interior connections 49 within the perimeter 48 of the inflatable curtain 14.

In the illustrated embodiment, the perimeter connection 46 and the interior connections 49 are formed by weaving the panels 40 and 42 together. In alternative constructions of the inflatable curtain 14, means such as stitching, dielectric sealing, ultrasonic bonding, heat sealing, and adhesives may be used to interconnect the first and second panels 40 and 42 in order to form the perimeter connection 46 and the connections 49. Panel portions that are interconnected are not spaced apart and there is no space, opening or passage between them.

In the preferred construction of the inflatable curtain 14, the curtain is formed by weaving the first and second panels 40 and 42 simultaneously while also interweaving the perimeter connection 46 and the interior connections 49 as single layers of fabric. This can be accomplished by using a Jacquard or Dobby weaving machine. The weaving machines are pre-programmed to weave the first and second panels 40 and 42 along with the perimeter connection 46 and the interior connections 49 at the same time. No intermediate steps are required to interconnected the panels 40 and 42 in this manner.

Preferably, the inflatable curtain 14 is constructed of a woven fabric, such as nylon, that is coated with a gas impermeable material, such as urethane or silicone. The inflatable curtain 14 thus may have a substantially gas-tight construction. Other materials, such as elastomers, plastic films, or combinations thereof, may also be used to construct the inflatable curtain 14, in which case the curtain may have a non-woven construction and the interconnection of the panels would be by a method other than weaving. The materials used to construct the inflatable curtain 14 may also be single or multi-layered materials.

The first and second panels 40 and 42, the perimeter connection 46, and the interior connections 49 may be coated using a laminate film, slurry, and/or a spray coating, such as silicone, urethane, or other known suitable materials, in order to achieve a substantially gas-tight construction. This helps to prevent gas from permeating through the first and second panels 40 and 42, the perimeter connection 46, and the interior connections 49.

The perimeter 48 (FIG. 1) of the inflatable curtain 14 is defined by upper and lower edges 50 and 52, respectively, of the curtain and front and rear edges 54 and 56, respectively, of the curtain that are spaced apart horizontally along the upper and lower edges. The perimeter connection 46 defines an inflatable volume of the inflatable curtain 14.

The front and rear edges 54 and 56 of the inflatable curtain 14 partially define front and rear portions 62 and 64, respectively, that are spaced apart horizontally along the upper and lower edges 50 and 52 and extend between the upper and lower edges. A middle portion 66 of the inflatable curtain 14 is positioned between the front and rear portions 62 and 64 of the inflatable curtain 14 and extends between the upper and lower edges 50 and 52 of the curtain.

As illustrated in FIG. 1, the front and rear edges 54 and 56 extend between the upper and lower edges 50 and 52. The front and rear edges 54 and 56 could, however, be omitted and the upper and lower edges 50 and 52 could be curved and extended until they intersect, in which case the front and rear portions 62 and 64 would be partially defined by the intersecting upper and lower edges.

The apparatus 10 (FIG. 1) includes two tethers 80 and 82 for helping to maintain the curtain 14 in position when inflated. The two tethers 80 and 82, which are a rear tether and a front tether, are similar to each other. Also, the attachment of the tethers 80 and 82 to the curtain 14 is similar, and therefore only the rear tether 80 and its attachment to the curtain 14 are described in detail below. The front tether 82 is preferably a fixed tether secured to the vehicle side structure 16, in a manner not shown.

The curtain 14 (FIGS. 1–3) has a tether mounting portion 90 for attachment of the rear tether 80. The tether mounting portion 90 comprises interconnected portions of the first and second panels 40 and 42.

Specifically, the tether mounting portion 90 (FIGS. 2 and 3) of the curtain 14 comprises a first area of the curtain, designated with the reference numeral 92 in FIGS. 2 and 3, that comprises portions 94 and 96 of the first and second panels 40 and 42, respectively. The panel portions 94 and 96 are interconnected, for example, as by being interwoven in the manner described above.

The tether mounting portion 90 is located adjacent the rear edge 56 of the curtain 14. The tether mounting portion 90 has a generally circular outer periphery when viewed in elevation as in FIG. 2. In an alternative embodiment, the tether mounting portion 90 could have a different configuration, for example, a D-shaped outer periphery with the portion of the periphery nearest the rear edge 56 of the curtain 14 being straight rather than curved.

The tether mounting portion 90 is partially enclosed by, and partially defined by, a second area of the curtain 14, designated with the reference numeral 98 in FIGS. 2 and 3. The second area 98 comprises portions 100 and 102 of the first and second panels 40 and 42, respectively. The panel portions 100 and 102 are not interconnected but instead are spaced apart from each other and define an opening or passage 104 between them. The second area 98, and the passage 104, have a generally C-shaped configuration as viewed in FIG. 2, extending around the tether mounting portion 90. The second area 98 of the curtain 14 terminates at the rear edge 56 of the curtain. Thus, the passage 104 has opposite first and second end portions 106 and 108 that are open to the exterior of the curtain 14, along the rear edge 56 of the curtain.

The second area 98 of the curtain 14 is partially enclosed by, and partially defined by, a third area of the curtain 14, designated with the reference numeral 110 in FIGS. 2 and 3. The third area 110 comprises portions 112 and 114 of the first and second panels 40 and 42, respectively. The panel portions 112 and 114 are interconnected, for example, as by being interwoven as described above. In FIG. 2, the panel portions 112 and 114 are shown as being parts of the perimeter connection 46 of the curtain 14.

FIGS. 2 and 3 illustrate in detail the attachment of the rear tether 80 to the curtain 14. The rear tether 80 as illustrated is a fabric strap, or cord, that may be woven or braided from the same material as the curtain. Alternatively, the tether 80 may be made from a different material, such as steel cable. In the illustrated embodiment, the tether 80 has a circular cross-sectional configuration, although it could have a different configuration in another embodiment.

The tether 80 has a first end portion 120 and a second end portion 122 (FIG. 1). The second end portion 122 of the tether 80 is connected with a slider shown schematically at 124. The slider 124 is mounted on a track shown schematically at 126. The track 126 is fixed on the vehicle side structure 16.

The first end portion 120 (FIGS. 2 and 3) of the tether 80 comprises a loop 130 that extends around the tether mounting portion 90 of the curtain 14. The loop 130 includes a first portion 132 that is disposed in the passage 104 adjacent the first end portion 106 of the passage, and a second portion 134 that is disposed in the passage 104 adjacent the second end portion 108 of the passage. A third portion 136 of the loop 130 extends between and interconnects the first and second portions 132 and 134.

A main body portion 138 (FIG. 2) of the tether 80 extends from the first loop portion 132 to the second end portion 122 of the tether. A terminal end portion 140 of the tether 80 extends from the second loop portion 134. The terminal end portion 140 is fastened to the main body portion 138 by a fastener 142, so that the tether 80 is in a force-transmitting relationship with the curtain 14. In the illustrated embodiment, the fastener 142 comprises a stitching section. Instead of sewing, the fastener 142 could comprise a plastic or metal clip, for example, or ultrasonic welding, or some other suitable type of attachment.

The vehicle 12 includes a sensor mechanism 150 (shown schematically in FIG. 1) for sensing a side impact to the vehicle 12 and/or a rollover condition of the vehicle 12. In the event of a rollover condition of the vehicle 12 or a side impact to the vehicle for which inflation of the inflatable curtain 14 is desired, the sensor mechanism 150 provides an electrical signal over lead wires 152 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing opens and the inflatable curtain 14 inflates away from the roof 18 in a downward direction as shown in the drawings and in a downward direction with respect to the direction of forward travel of the vehicle 12 into the position illustrated in FIG. 1.

The inflatable curtain 14, when inflated, extends along the side structure 16 of the vehicle 12 and is positioned between the side structure and any occupant of the vehicle. When the inflatable curtain 14 is in the inflated condition, the second panel 42 is positioned adjacent the side structure 16 of the vehicle 12. The upper edge 50 (FIG. 2) of the inflatable curtain 14 is positioned adjacent the intersection of the roof 18 and the side structure 16 of the vehicle 12. The front edge 54 of the inflatable curtain 14 is positioned adjacent an A pillar 154 of the vehicle 12. The rear edge 56 of the inflatable curtain 14 is positioned adjacent a C pillar 156 of the vehicle 12. The inflatable curtain 14 extends between the A pillar 154 and the C pillar 156 of the vehicle 12 and overlies at least a portion of the A pillar, C pillar, and a B pillar 158 of the vehicle.

As the inflatable curtain 14 inflates, the slider 124 moves downward along the track 126. The second end portion 122 of the tether 80 moves with the slider 124. When the curtain 14 is inflated as shown in FIG. 1, the tether 80 acts between the curtain and the lower end of the track 126 to help maintain the curtain in position. Thus, the tether 80, together with the front tether 82, can help to maintain the curtain 14 in its inflated position.

From the above description of the invention, those skilled in the art will perceive improvements, changes and modifications. Such improvements, changes and modifications within the skill of the art are intended to be covered by the appended claims.

Having described the invention, I claim:

1. Apparatus for helping to protect an occupant of a vehicle, comprising:

an inflatable vehicle occupant protection device comprising overlying first and second panels interconnected to form a perimeter connection extending along a perimeter of said inflatable device and to define an inflation fluid volume between said first and second panels; and a tether having a first end portion connected with said inflatable device and a second end portion for connection with a portion of the vehicle for helping to maintain said inflatable device in position when inflated;

said inflatable device having a tether mounting portion comprising interconnected portions of said first and second panels;

said first end portion of said tether extending between said first and second panels and extending around said tether mounting portion.

2. Apparatus as set forth in claim 1 wherein said perimeter connection and said tether mounting portion of said first and second panels comprise interwoven portions of said first and second panels.

3. Apparatus as set forth in claim 1 wherein said perimeter connection and said tether mounting portion of said first and second panels comprise stitched portions or dielectric sealed portions or ultrasonically bonded portions or heat sealed portions or adhesively joined portions of said first and second panels.

4. Apparatus as defined in claim 1 wherein said inflatable device is an inflatable curtain.

5. Apparatus as defined in claim 4 wherein said inflatable curtain has a stored position extending along the side structure of the vehicle near the intersection of the side structure and the vehicle roof, said inflatable curtain being inflatable in a downward direction away from the vehicle roof into an inflated position between the side structure of the vehicle and a vehicle occupant, said first end portion of said tether forming a loop extending between said first and second panels and around said tether mounting portion.

6. Apparatus as set forth in claim 1 wherein said tether mounting portion is disposed adjacent an edge of said device and comprises a curved end surface presented away from said edge of said device, said first end portion of said tether extending around said curved end surface and being in abutting engagement with said curved end surface when said device is inflated.

7. Apparatus as set forth in claim 1 wherein said tether comprises a fabric strap having said first end portion looped around said tether mounting portion.

8. Apparatus as set forth in claim 7 wherein said perimeter connection and said tether mounting portion of said first and second panels comprise interwoven portions of said first and second panels.

9. Apparatus for helping to protect an occupant of a vehicle that has a side structure and a roof, said apparatus comprising:

an inflatable vehicle occupant protection device having a stored position extending along the side structure of the vehicle near the intersection of the side structure and the vehicle roof, said inflatable device being inflatable in a downward direction away from the vehicle roof into an inflated position between the side structure of the vehicle and a vehicle occupant; and a tether having a first end portion connected with said inflatable device and a second end portion for connection with a portion of the vehicle for helping to maintain said inflatable device in position when inflated;

said inflatable device comprising first and second panels defining an inflation fluid volume, said inflatable device having a tether mounting portion at which said first and second panels are interconnected; and said first end portion of said tether forming a loop extending between said first and second panels and around said tether mounting portion; said first end portion of said tether having a terminal end fastened to another portion of said tether to provide said loop.

10. Apparatus as recited in claim 1 wherein said inflatable device is a side curtain and further comprising a housing for storing said side curtain in a stored position, said inflatable device and said housing having a generally elongated configuration extending along the side structure of the vehicle near the intersection of the side structure and the vehicle roof when said inflatable device is in said stored position, said tether extending from a front or rear portion of said inflatable device when inflated.

11. Apparatus as set forth in claim 9 wherein said perimeter connection and said tether mounting portion of said first and second panels comprise interwoven portions of said first and second panels.

* * * * *